(12) United States Patent
Shimoyama et al.

(10) Patent No.: US 9,031,395 B2
(45) Date of Patent: May 12, 2015

(54) MOVING MEMBER CONTROL APPARATUS AND IMAGING APPARATUS INCORPORATING THE SAME

(71) Applicant: Olympus Corporation, Tokyo (JP)

(72) Inventors: Masanori Shimoyama, Tokyo (JP); Takashi Ishikawa, Tokyo (JP); Rintaro Nishihara, Tokyo (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 14/228,403

(22) Filed: Mar. 28, 2014

(65) Prior Publication Data

US 2014/0212118 A1 Jul. 31, 2014

Related U.S. Application Data

(63) Continuation of application No. PCT/JP2013/050188, filed on Jan. 9, 2013.

(30) Foreign Application Priority Data

Mar. 28, 2012 (JP) .................... 2012-072763

(51) Int. Cl.
*G03B 17/00* (2006.01)
*G02B 27/64* (2006.01)
*G03B 5/00* (2006.01)

(52) U.S. Cl.
CPC ............ *G02B 27/646* (2013.01); *G03B 5/00* (2013.01)

(58) Field of Classification Search
USPC .......................................................... 396/55
See application file for complete search history.

(56) References Cited

U.S. PATENT DOCUMENTS

| 7,348,745 | B2* | 3/2008 | Okita et al. .................... 318/560 |
| 7,496,288 | B2* | 2/2009 | Seo ................................ 396/55 |
| 2005/0270379 | A1 | 12/2005 | Seo | |
| 2006/0284495 | A1 | 12/2006 | Seo et al. | |
| 2007/0065128 | A1* | 3/2007 | Liao et al. ........................ 396/55 |
| 2007/0127907 | A1 | 6/2007 | Iwasaki et al. | |

FOREIGN PATENT DOCUMENTS

| JP | 10-254019 A | 9/1998 |
| JP | 2005-184122 A | 7/2005 |
| JP | 2005-351917 A | 12/2005 |
| JP | 2007-025616 A | 2/2007 |
| JP | 2007-156063 A | 6/2007 |
| JP | 2007-233214 A | 9/2007 |
| JP | 2008-191282 A | 8/2008 |
| JP | 4564930 A | 10/2010 |

OTHER PUBLICATIONS

International Search Report dated Apr. 23, 2013 issued in PCT/JP2013/050188.

* cited by examiner

*Primary Examiner* — Clayton E Laballe
*Assistant Examiner* — Dennis Hancock
(74) *Attorney, Agent, or Firm* — Scully, Scott, Murphy & Presser, P.C.

(57) ABSTRACT

The present invention relates to a moving member control apparatus that makes sure unerring control of a moving member having an ill-balanced structure and an imaging apparatus that incorporates that control apparatus.

15 Claims, 17 Drawing Sheets

MOVING MEMBER CONTROL APPARATUS AND IMAGING APPARATUS INCORPORATING THE SAME

The present application claims priority under 35 USC section 119 from Japanese patent application serial No. 2012-072763 filed in Japan on Mar. 28, 2012, the entire contents of which are hereby expressly incorporated by reference into the present application.

BACKGROUND OF THE INVENTION

The present invention relates to a moving member control apparatus that makes sure unerring control of a moving member having an ill-balanced structure and an imaging apparatus that incorporates that control apparatus.

There is a camera-shake correction apparatus as an example of controlling a moving member, and a conventional example of that camera-shake correction apparatus is typically shown in Patent Publication 1. This camera-shake correction apparatus includes a pair of voice coil motors in each of the X and Y directions of a moving member having an imaging device to make correction for camera-shake. The camera-shake correction apparatus disclosed in Patent Publication 1 comprises voice coil motors located in such a way as to apply force to the position of center of gravity of the moving member so that there is no rotation of the imaging device at the time of translation of the moving member in the X and Y directions.

Another example of the camera-shake correction apparatus is disclosed in Patent Publication 2. The camera-shake correction apparatus disclosed in Patent Publication 2 uses a spring that keeps a moving member against rotation upon application of force to it.

Patent Publication 1: U.S. Pat. No. 4,564,930
Patent Publication 2: JP(A) 10-254019

SUMMARY OF THE INVENTION

Objects of the invention are to provide a small-size, high-degree-of-freedom-in-design moving member control apparatus capable of controlling a moving member in such a way as to move rapidly and unerringly, and an imaging apparatus incorporating the same.

The moving member control apparatus according to the present invention is characterized by comprising a base part, a moving part capable of moving relatively with respect to the base part, a first driving portion that applies driving force to the moving part, a second driving portion that applies driving force to the moving part, a first instruction portion that gives an instruction to the first driving portion about a displacement position (where to move), a second instruction portion that gives an instruction to the second driving portion about a displacement position, a first position acquisition portion that acquires a real position of the first driving portion, a second position acquisition portion that acquires a real position of the second driving portion, a first deviation calculation portion that calculates a first deviation between a displacement position given to the first instruction portion and a real position acquired by the first position acquisition portion, a second deviation calculation portion that calculates a second deviation between a displacement position given to the second instruction portion and a real position acquired by the second position acquisition portion, a correction portion that produces a first correction signal and a second correction signal corrected for the first deviation and the second deviation, respectively, depending on a difference between the first deviation and the second deviation, and a control portion that receives for the first correction signal and the second correction signal to control the driving forces of the first driving portion and the second driving portion, respectively.

Still other objects and advantages of the invention will in part be obvious and will in part be apparent form the specification.

The invention accordingly comprises the features of construction, combinations of elements, and arrangement of parts which will be exemplified in the construction hereinafter set forth, and the scope of the invention will be indicated in the claims.

DESCRIPTION OF EXEMPLARY EMBODIMENTS

Figure 1:
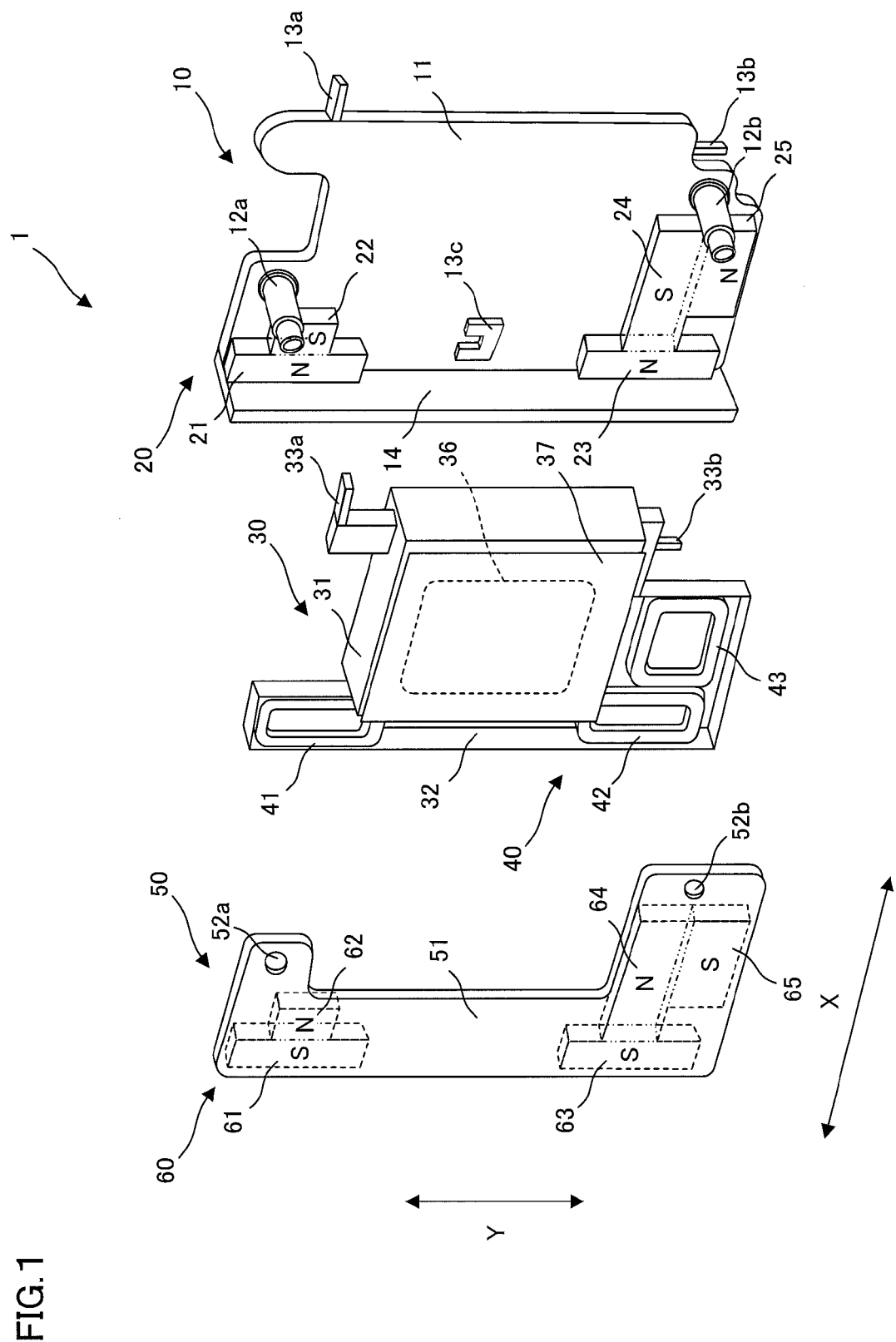
FIG. 1 is illustrative of the image-shake correction apparatus, before assembly, according to one embodiment of the invention.

One embodiment of the invention will now be explained.
FIG. 1 is illustrative of an image-shake correction apparatus according of this embodiment of the invention before assembly.
The image-shake correction apparatus 1 according to the embodiment of the invention here serving as a moving member control apparatus comprises a base part 10 working as the foundation, a moving part 30 movably supported on the base part 10, and a magnet support portion 50 that is opposed to the base part 10 with the moving part 30 between them and fixed to the base part 10.

The base part 10 is fixedly provided with a first permanent magnet group 20, and the magnet support portion 50 is fixedly provided with a second permanent magnet group 60. The moving part 30 is fixedly provided with a coil group 40. The first and second permanent magnet groups 20 and 60 include oppositely magnetized and located portions in such a way as to generate a magnetic field in an opposite space. The coil group 40 is located in a space where the first permanent magnet group 20 is opposite to the second permanent magnet group 60. In FIG. 1 and other figures, it is noted that the magnetic poles of the first and second permanent magnet groups 20 and 60 face on the side of the coil group 40.

Figure 2:
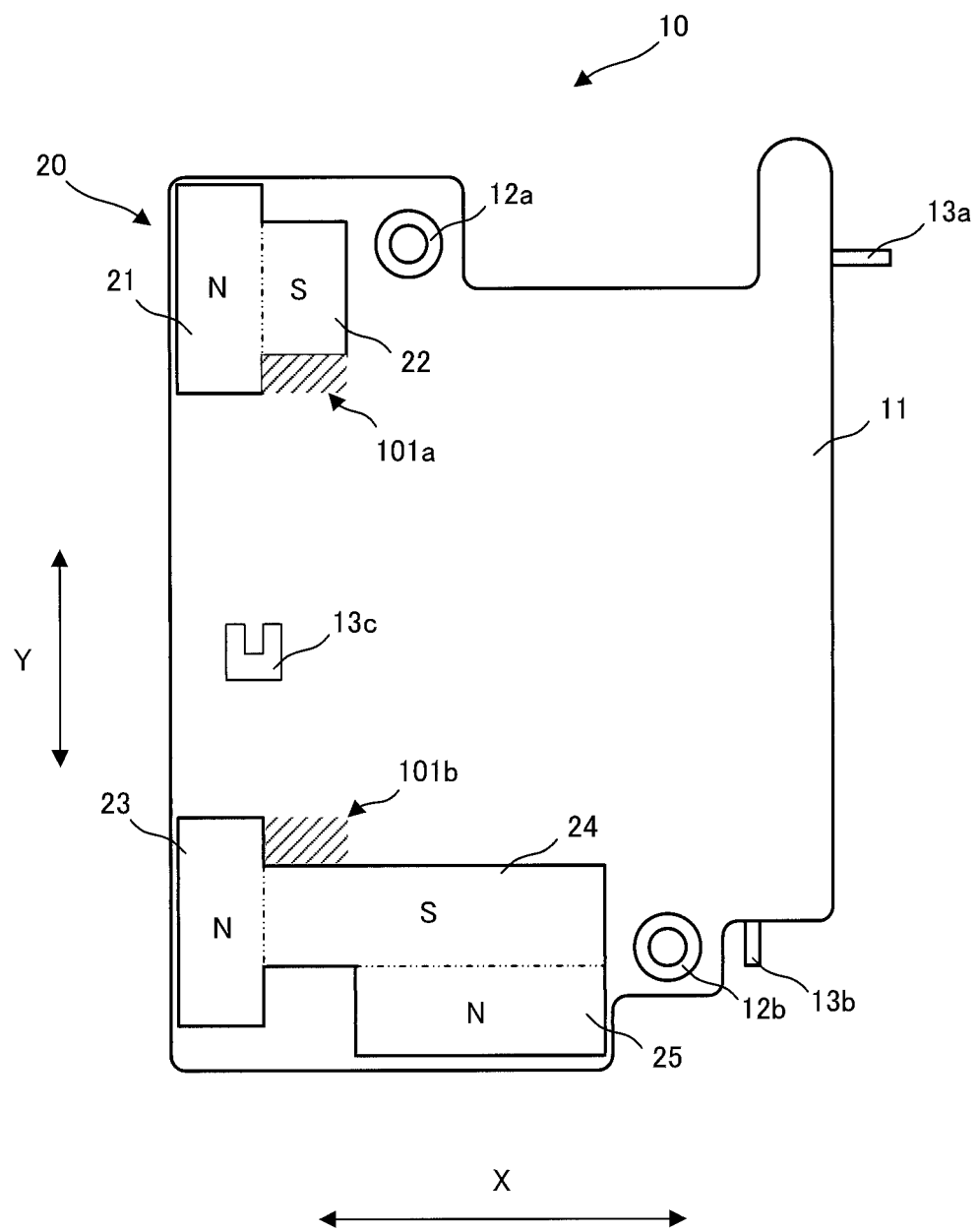
FIG. 2 is illustrative of a base part.

FIG. 2 is illustrative of the base part 10.

The base part 10 comprises a base body 11 formed of a magnetic material such as iron or an iron alloy, supporting through-holes 12a and 12b that are provided through the base body 11 for inserting screws (not shown) through them to support the magnet support portion 50 on the base part 10, and a first assembly of spring supports 13a, 13b and 13c for supporting springs (not shown) to support the moving part 30 on the base part 10 in a movable manner.

Here the X direction is defined as a first direction to the base part 10, and the Y direction is defined as a second direction orthogonal to the X direction, as shown in FIG. 2.

The first permanent magnet group 20 on the base portion 10 comprises a first magnet portion 21 that is N-polarized on the coil group 40 side, a second magnet portion 22 that opposes to the first magnet portion 21 in the X direction and S-polarized on the coil group 40 side, a third magnet portion 23 that is located away from the first magnet portion 21 in the Y direction, a fourth magnet portion 24 that opposes to the third magnet portion 23 in the X direction and S-polarized on the coil group 40 side, and a firth magnet portion 25 that opposes to the fourth magnet portion 24 in the Y direction and N-polarized on the coil group 40 side. Note here that the faces of the first 21 to the fifth magnet portion 25 on the coil group 40 side and the opposite side are oppositely polarized.

The side of the second magnet portion 22 in the Y direction of the fourth magnet portion 24 is shorter than the first magnet portion 21 with a first space 101a leaving as a cutout that is not opposite to the first magnet portion 21, and the side of the fourth magnet portion 24 in the Y direction of the second magnet portion 22 is shorter than the third magnet portion 23 with a second space 101b leaving as a cutout that is not opposite to the third magnet portion 23.

Figure 3:
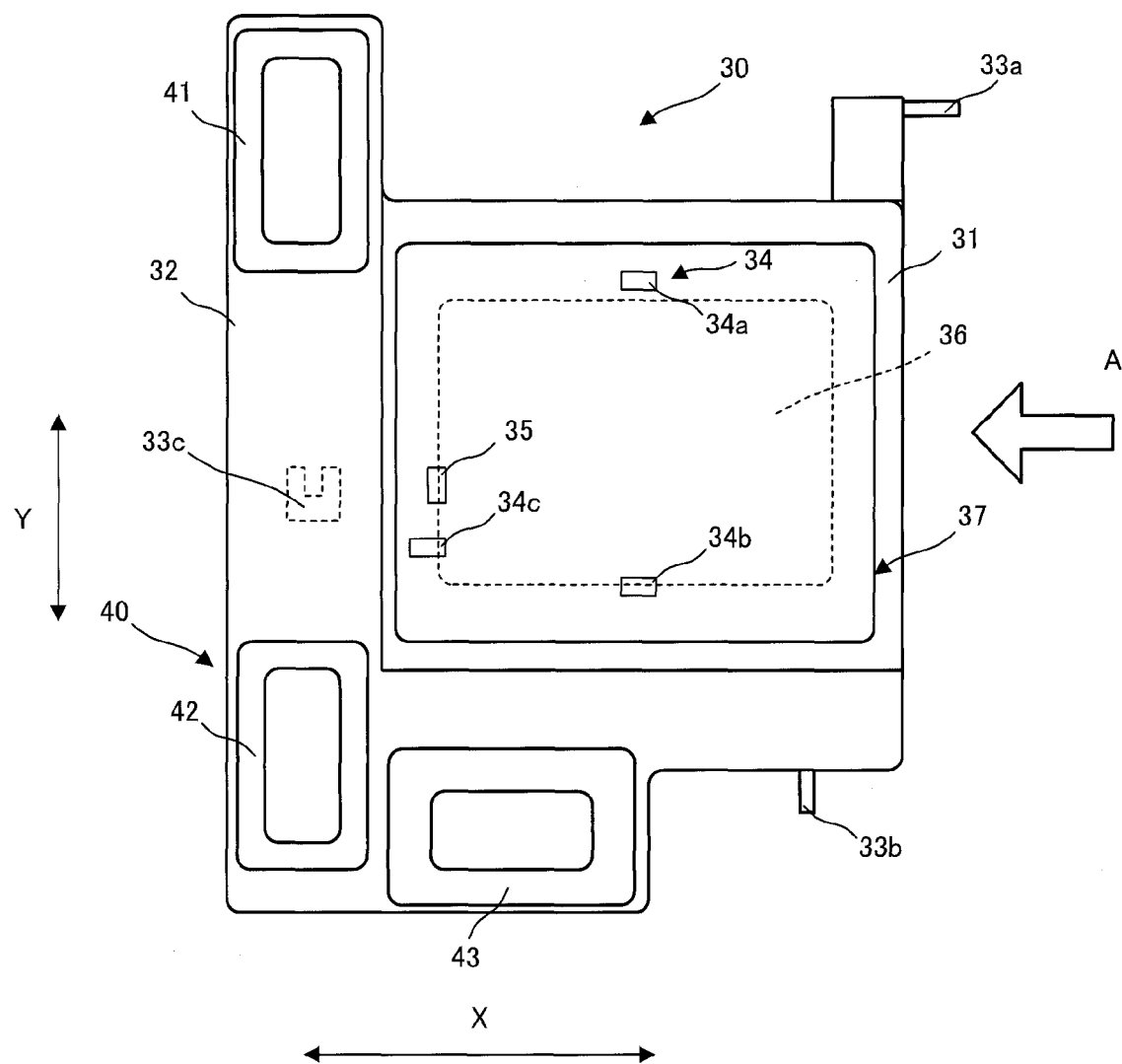
FIG. 3 is illustrative of a moving part.
Figure 4:
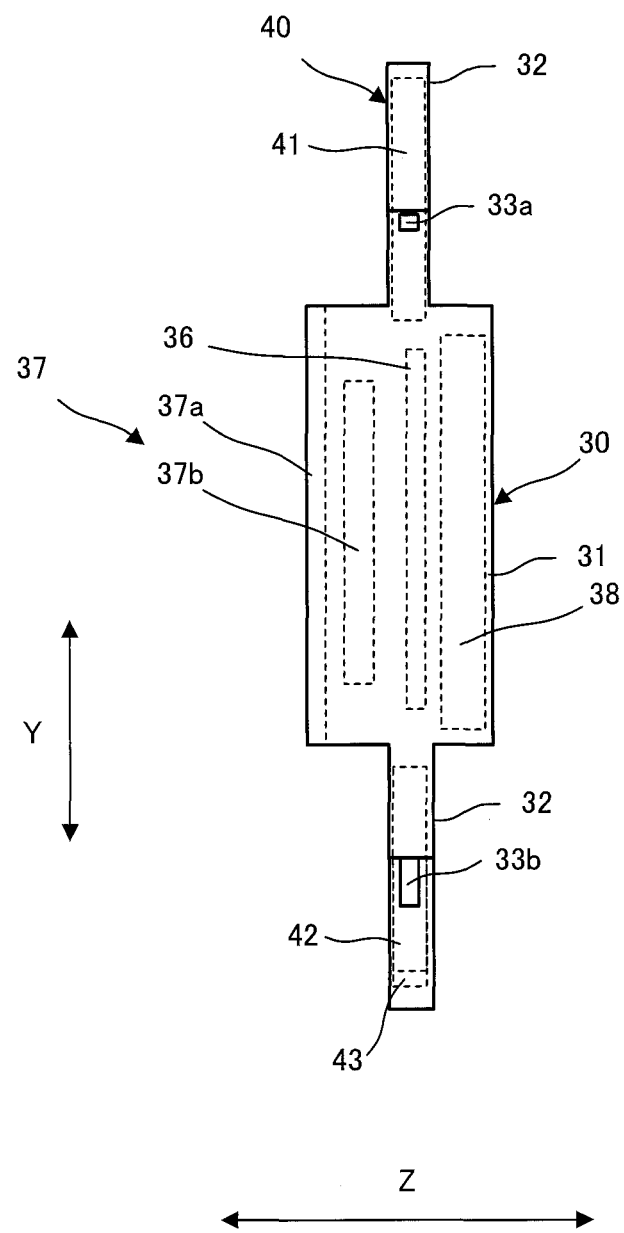
FIG. 4 is an illustration of FIG. 3 as viewed from arrow A.

FIG. 3 is illustrative of the moving part 30, and FIG. 4 is an illustration of FIG. 3 as viewed from arrow A.

The moving part 30 comprises a moving body 31 formed of a nonmagnetic material such as an aluminum alloy or synthetic resin, a coil housing 32 provided on a part of the circumference of the moving body 31, and a second assembly of spring supports 33a, 33b and 33c for supporting springs (not shown) to support the moving part 30 on the base part 10 in a movable manner. The moving part 30 is also provided with a Hall element assembly 34 and sensors like a temperature sensor 35. The Hall element assembly 34 comprises a first Hall element 34a, a second Hall element 34b and a third Hall element 34c.

Here the X direction is defined as a first direction to the moving part 30, and the Y direction is defined as a second direction orthogonal to the X direction, as shown in FIG. 3.

The moving body 31 includes an imaging device 36 for photoelectric conversion of light, a filter group 37 and an electric device 38 mounted on it. The filter group 37 comprises an ultrasonic filter 37a and an infrared cut filter 37b as viewed from its side away from the imaging device 36. On the side of the filter group 37 opposite to the imaging device 36 there is the electric device 38 mounted to detect the quantity of light received at the imaging device and process image signals based on that quantity of light received, etc.

The coil housing 32 is provided on a part of the circumference of the moving body 31 and has a recess for stowing the coil group 40. The moving body 31 is longer than the coil housing 32 in the Z direction orthogonal to the X and Y directions.

The coil group 40 comprises a first coil 41, a second coil 42 and a third coil 43. The first coil 41 is located in opposition to the first 21 and the second magnet portion 22 on the base part 10 shown in FIG. 2. The second coil 42 is located in such a way as to oppose to the third 23 and the fourth magnet portion 24 on the base part 10 shown in FIG. 2, and the third coil 43 is located in such a way as to oppose to the fourth 24 and the fifth magnet portion 25 on the base part 10 shown in FIG. 2. The first, second and third Hall elements 34a, 34b and 34c are mounted in such a way as to correspond to the first, second and third coils 41, 42 and 43, respectively.

Figure 5:
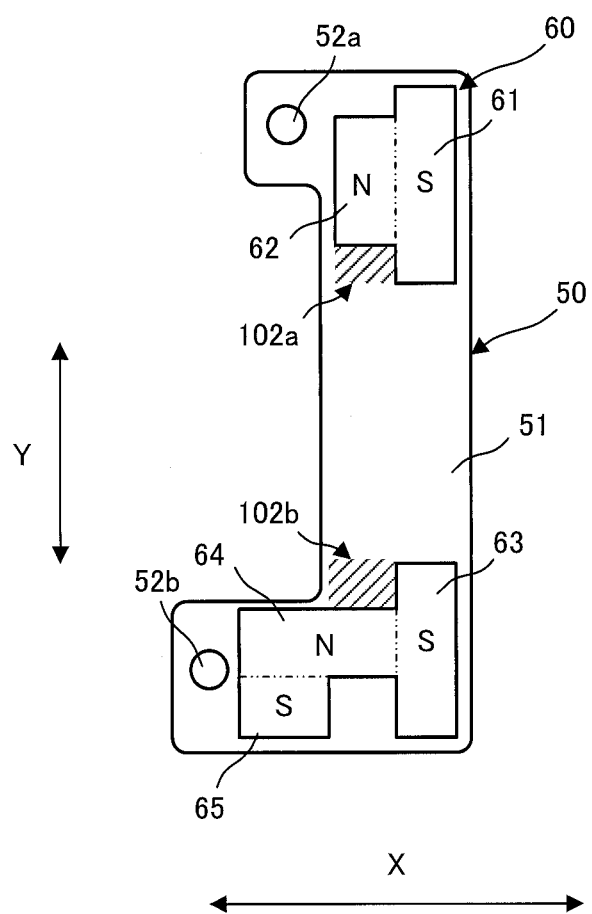
FIG. 5 is illustrative of a magnet support portion.

FIG. 5 is illustrative of the magnet support portion 50 of FIG. 1, as viewed from the moving part 30 side.

The magnet support portion 50 comprises a support body 51 formed of a magnetic material such as iron or an iron compound, and supporting through-holes 52a and 52b that are provided through the support body 51 for inserting screws (not shown) through it to support the magnet support portion 50 relative to the base body 10.

Here the X direction is defined as a first direction to the magnet support portion 50, and the Y direction is defined as a second direction orthogonal to the X direction, as shown in FIG. 4.

The second permanent magnet group 60 on the magnet support portion 50 comprises a first opposite magnet portion 61 that is S-magnetized on the coil group 40 side, a second opposite magnet portion 62 that is opposite to the first opposite magnet portion 61 and N-polarized on the coil group 40 side, a third opposite magnet portion 63 that is located away from the first opposite magnet portion 61 in the Y direction and S-polarized on the coil group 40 side, a fourth opposite magnet portion 64 that is opposite to the third opposite magnet portion 63 in the X direction and N-magnetized on the coil group 40 side, and a fifth opposite magnet portion 65 that is in opposition to the fourth magnet portion 64 in the Y direction and S-magnetized on the coil group 40 side. Note here that the first 61 to the fifth opposite magnet portion 65 are oppositely magnetized on the coil group 40 side and the opposite side.

The side of the fourth opposite magnet portion 64 in the Y direction of the second opposite magnet portion 62 has a cutout and is shorter than the first opposite magnet portion 61, with a third space 102a serving as a cutout that is not in opposition to the first opposite magnet portion 61, and the side of the second opposite magnet portion 62 in the Y direction of the fourth opposite magnet portion 64 has a cutout and is shorter than the third opposite magnet portion 63, with a fourth space 102b serving as a cutout that is not in opposition to the third opposite magnet portion 63.

Figure 6:
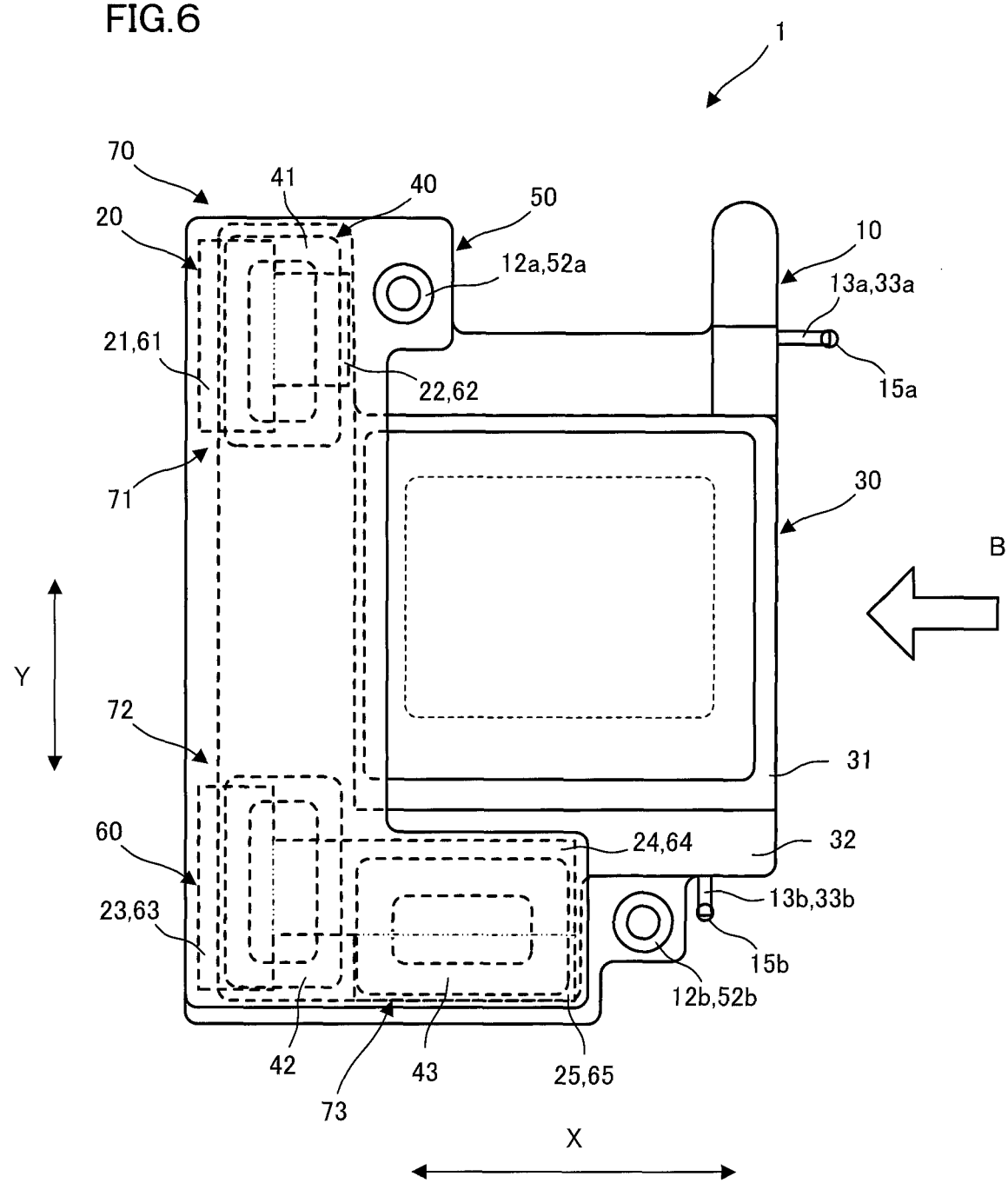
FIG. 6 is illustrative of the image-shake correction apparatus, after assembly, according to one embodiment of the invention.
Figure 7:
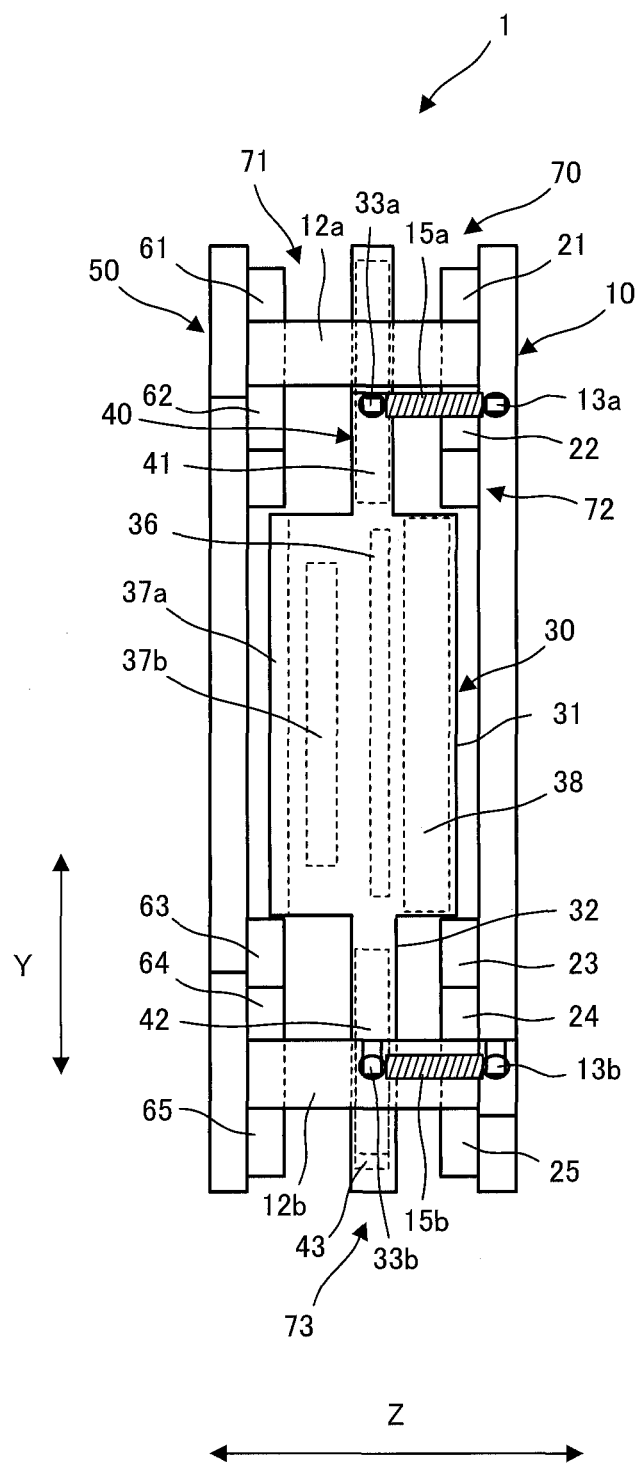
FIG. 7 is an illustration of FIG. 6 as viewed from arrow B.

FIG. 6 is illustrative of the image-shake correction apparatus 1 assembled according to the invention, and FIG. 7 is an illustration of FIG. 6 as viewed from arrow B.

To assemble the image-shake correction apparatus 1 according to the embodiment of the invention here, screws (not shown) are inserted through the supporting through-holes 12a and 12b in the base part 10 shown in FIG. 1 and the threaded through-holes 52a and 52b in the magnet support portion 50, and the support body 51 of the magnet support portion 50 is supported by a plate 41 attached to the base body 11 of the base part 10. Consequently, the support body 51 is firmly supported on the base body 11 at three sites: supporting through-holes 12a and 12b and plate 14. In addition, coil springs 15a, 15b and 15c are mounted on the first spring supports 13a, 13b and 13c of the base part 10, and on the second spring supports 33a, 33b and 33c of the moving part 30, respectively.

Preferably, the base part 10 and moving part 30 are supported in a fashion generally called the ball support wherein they are supported by a plurality of spherical balls (not shown) held between them. As the spherical balls roll, it enables the moving part 30 to move relative to the base part 10.

With the image-shake correction apparatus assembled in place, the first permanent magnet group 20 of the base part 10 is opposite to, and away from, the second permanent magnet group 60 of the magnet support portion 50. In a space between the first permanent magnet group 20 and second permanent magnet group 60, there is a magnetic field generated because the magnets are oppositely magnetized. Then, the coil group 40 of the moving part 30 is located in a discrete space having the magnetic field generated in it. Such arrangement of the first permanent magnet group 20, second permanent magnet group 60 and coil group 40 provides for formation of a voice coil motor 70.

In the embodiment of the invention here, the first and second magnet portions 21 and 22, first coil 41 and first and second opposite magnet portions 61 and 62 are combined together into a first X-direction voice coil motor 71 operating as a first voice coil motor for moving the moving part 30 in the X direction defined as the first direction, and the third and fourth magnet portions 23 and 24, second coil 42 and third and fourth opposite magnet portions 63 and 64 are combined together into a second X-direction voice coil motor 72 operating as a second voice coil motor for moving the moving part 30 in the X direction defined as the first direction. Further, the fourth and fifth magnet portions 24 and 25, third coil 43 and fourth and fifth opposite magnet portions 64 and 65 are combined together into a Y-direction voice coil motor 73 operating as a third voice coil motor for moving the moving part 30 in the Y direction defined as the second direction.

Consequently, the fourth magnet portion 24 and the fourth opposite magnet portion 64 will be included in both the second X-direction voice coil motor 72 and Y-direction voice coil motor 73. Thus, at least one magnet portion in the first and second magnet groups 20 and 21 is set up in such a way as to be included in both the X- and Y-direction voice coil motors 72 and 73 to have a dual function of moving the moving part 30 in the X and Y directions. This will contribute to a reduction of parts count, and make it possible to reduce the size and cost of the apparatus.

In the embodiment of the invention here, as an electric current flows through the first and second coils 41 and 42, it causes the moving part 30 to move in the X direction, and as an electric current flows through the third coil 43, it causes movement of the moving part 30 in the Y direction.

In the embodiment of the invention here, the first and second magnet portions 21 and 22 in the first permanent magnet group 20 are magnetized as a single magnet; the third, fourth and fifth magnet portions 23, 24 and 25 in the first permanent magnet group 20 are magnetized as a single magnet; the first and second opposite magnet portions 61 and 62 in the second permanent magnet group 60 are magnetized as a single magnet; and the third, fourth and fifth opposite magnet portions 63, 64 and 64 in the second permanent magnet group 60 are magnetized as a single magnet. However, they may be magnetized as separate magnets or, alternatively, some of them may be magnetized as a separate magnet. Such separate magnetization could facilitate processing, and allow for simple low-cost production. The number of turns of the first, second and third coils 41, 42 and 43 may be varied depending on the volume of the cutout.

It is here to be noted that how to fix each magnet to the base part 10 and magnet support portion 50 is not specifically limited: it may be fixed using screwing, caulking or the like. In the embodiment of the invention here, an adhesive is typically used to fix the magnet to the base part 10 and magnet support portion 50.

Figure 8:
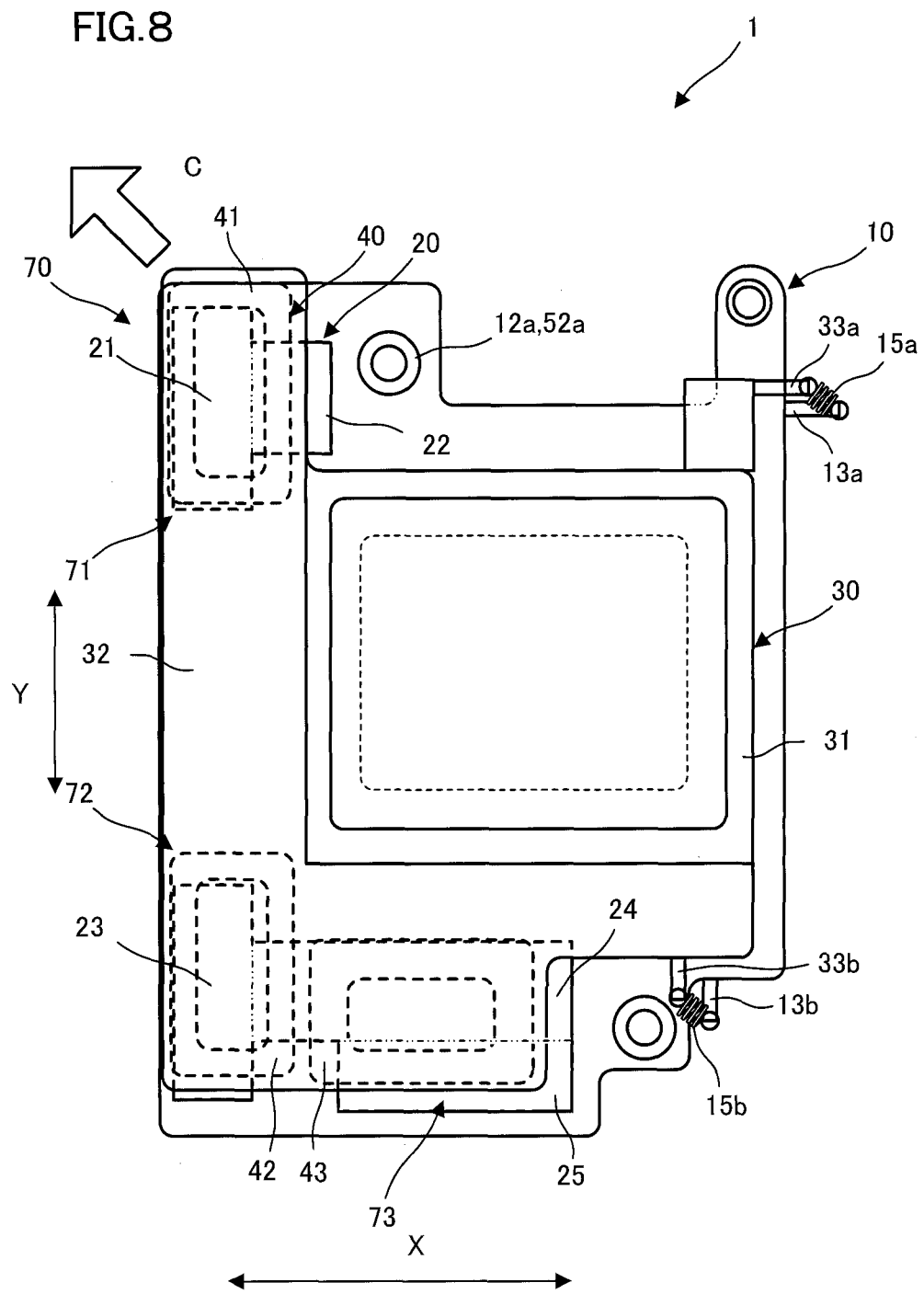
FIG. 8 is illustrative of the operation of the image-shake correction apparatus, after assembly, according to one embodiment of the invention.
Figure 9:
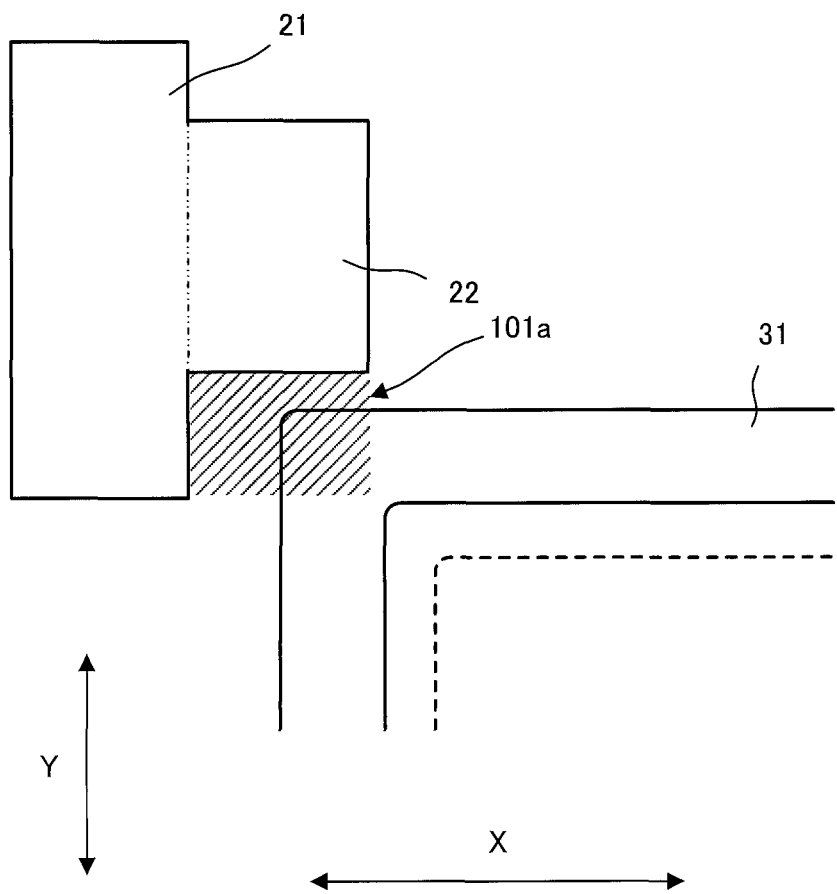
FIG. 9 is an enlarged view of a part of FIG. 8.

FIG. 8 is illustrative of the operation of the image-shake correction apparatus 1 after assembled according to the embodiment of the invention here, and FIG. 9 is an enlarged view of a part of FIG. 8. It is here to be noted that the magnet support portion 50 is left out of FIG. 8 for the purpose of making movement of the moving part 30 more visible, and only the first and second magnet portions 21 and 22 are shown together with the moving body 31 in FIG. 9.

As shown typically in FIG. 8, suppose now that the moving part 30 moves relative to the base part 10 in a direction indicated by arrow C. Thereupon, the moving body 31 comes closer to the first and second magnet portions 21 and 22. If the Y-direction length of the second magnet portion 22 is the same as the Y-direction length of the first magnet portion 21, then the moving body 31 will interfere with the magnet portion 22.

With the first space 101a defined by a cutout formed by making the Y-direction length of the second magnet portion 22 shorter than the Y-direction length of the first magnet portion 21, it is then possible to avoid interference of the moving body 31 with the second magnet portion 22, thereby reducing the size of the apparatus. It is here to be noted that if the first and second spaces 101a and 101b serving as cutouts are positioned in the central direction side of the base part 10 or moving part 30, the apparatus could be further reduced in size, or if the cutouts are positioned in a position where they overlap at least a part of a range wherein the moving part 30 is movable by the voice coil motor 30, the apparatus could be even further reduced in size.

It is here to be noted that if a cutout is provided for other magnet portion too, it is then possible to avoid interference of the moving body 31 with that magnet portion or interference of that magnet portion with other member, thereby reducing the size of the apparatus without narrowing down the moving range of the moving part 30.

While the embodiment of the invention here is explained with reference to a specific arrangement having permanent magnet groups in both the base part 10 and the magnet support portion 50, it is to be understood that only one of them may include permanent magnet groups provided that there is an output capable of moving the moving part 30.

Reference will now be made to control of the moving part in the image-shake correction apparatus 1 according to the embodiment of the invention here.

Figure 10:
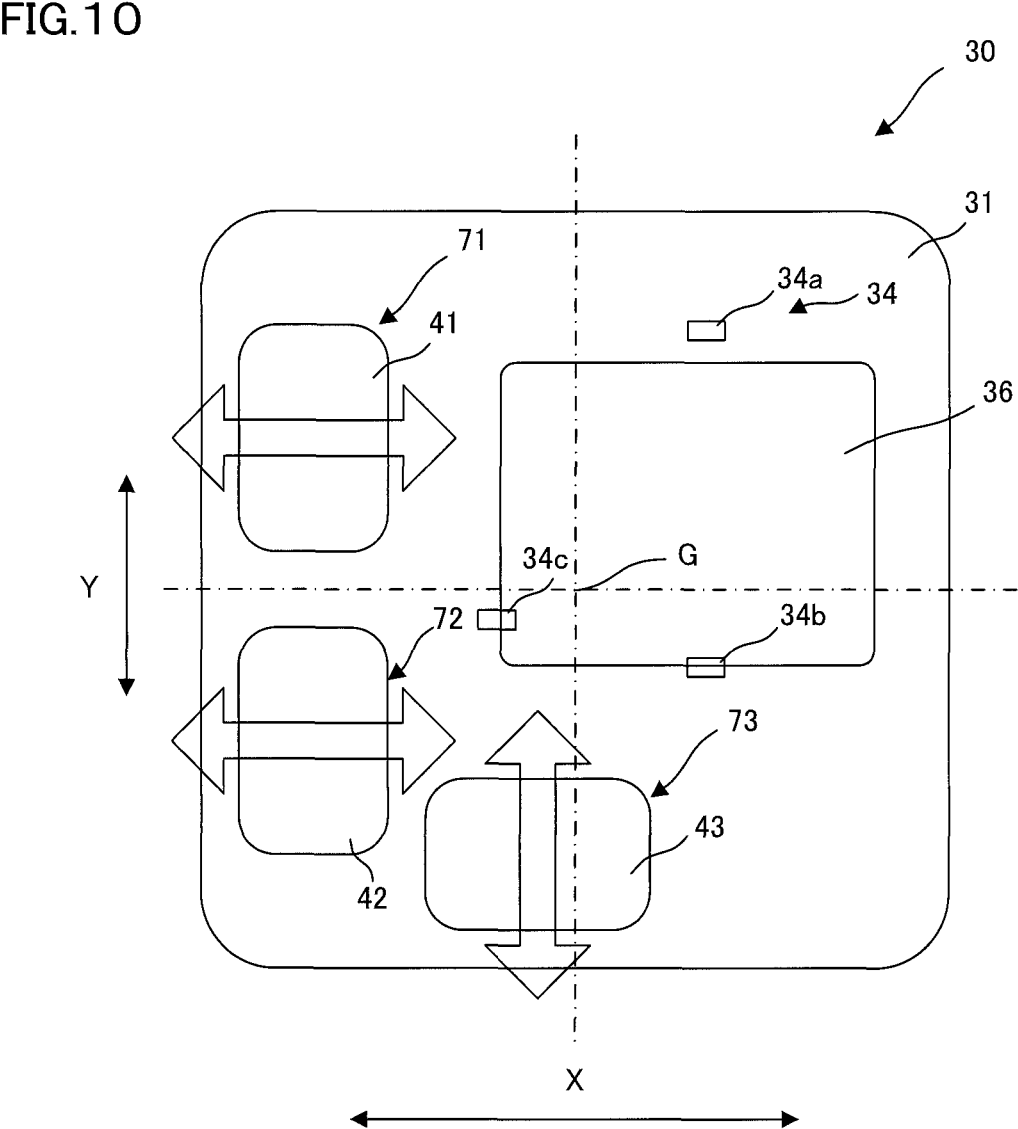
FIG. 10 is illustrative in schematic of the moving part of the image-shake correction apparatus according to one embodiment of the invention.

FIG. 10 is illustrative in schematic of the moving part 30 of the image-shake correction apparatus 1 according to the embodiment of the invention here.

The operation of the image-shake correction apparatus 1 according to the embodiment of the invention here is now explained with reference to FIG. 10. As shown, the first X-direction voice coil motor 71 as a first driving or actuating member and the second X-direction voice coil motor 72 as a second driving or actuating member are actuated to apply force to the moving part 30 thereby moving it in the X direction, and the Y-direction voice coil motor 73 as a third driving or actuating member is actuated to apply force to the moving part 30 thereby moving it in the Y direction. It is here to be noted that not only the voice coil motors but also other actuators capable of generating driving force may be used as the first, second and third actuating members.

For instance, while the first and second X-direction voice coil motors 71 and 72 are driven in place, the Y-direction voice coil motor 73 is actuated by an instruction given to it about the amount of driving thereby parallel shifting the moving part 30 in the Y direction, and while the Y-direction voice coil motor 73 is driven in place, the first and second X-direction voice coil motors 71 and 72 are actuated as much by an instruction given to them thereby parallel shifting the moving part 30 in the X direction. Further, as different amounts of driving are given to the first and second X-direction voice coils 71 and 72 and the Y-direction voice coil motor 73 for their actuation, it causes rotation of the moving part 30.

It is here to be noted that the voice coil motors 71, 72 and 73 are each provided with a Hall element 34 serving as a corresponding position acquisition element in the vicinity of the corresponding moving part 30 so that the positions of the voice coil motors 71, 72 and 73, for instance, the positions of movement of the first, second and third coils 41, 42 and 43 in a normal state can be detected.

Figure 11:
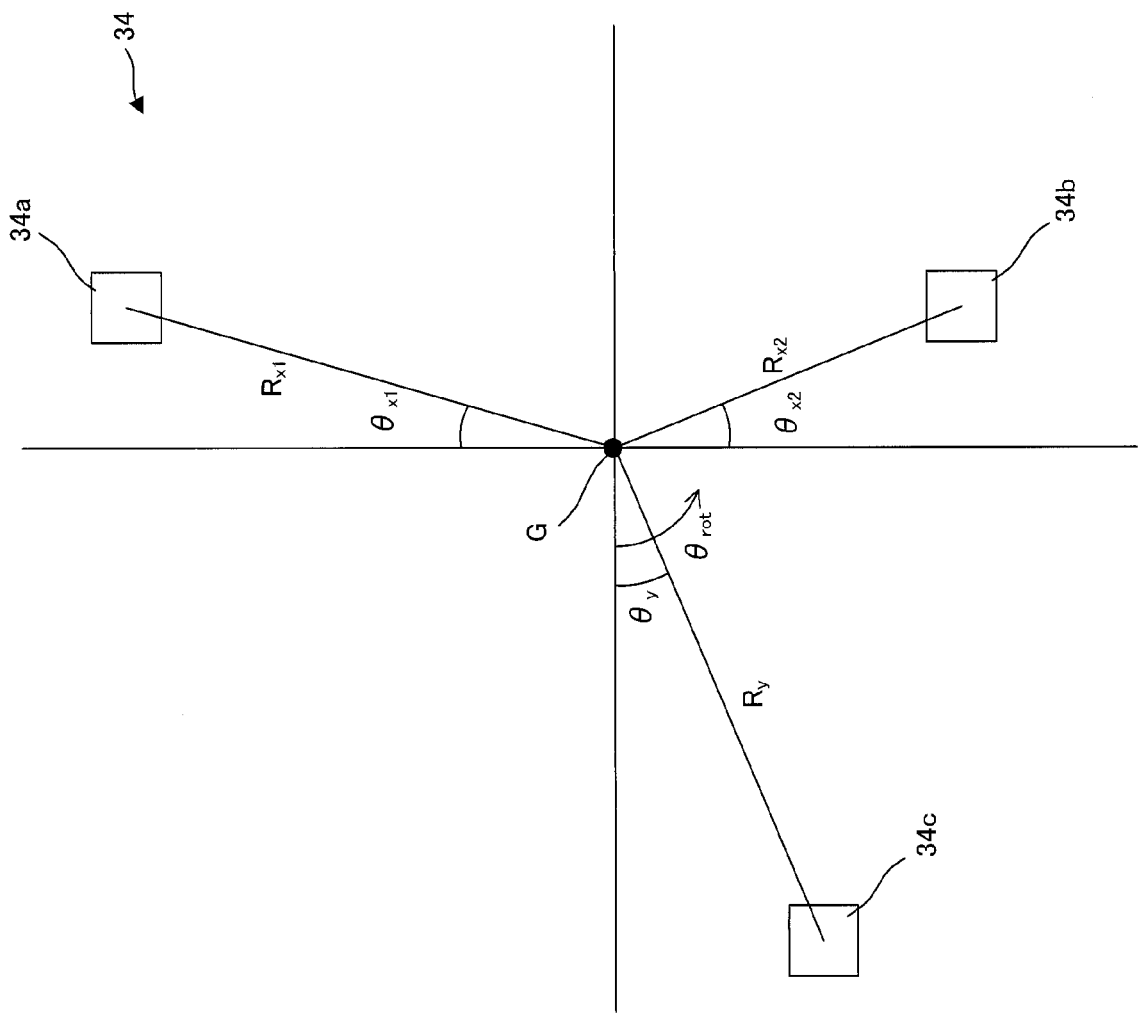
FIG. 11 is illustrative of what relations the Hall elements have to the center of gravity in one embodiment of the invention.

FIG. 11 is illustrative of relations between the Hall elements here and the center of gravity.

In the embodiment of the invention here, Hall elements 34 and the center of gravity G are located in such a way as to meet the relations shown in FIG. 11. As shown in FIG. 10, the moving part 30 receives driving forces from the voice coil motors 71, 72 and 73. For instance, when, as contemplated herein, the position of center of gravity G of the moving part 30 does not lie on the straight line of the vector of the driving or actuating force given by the Y-direction voice coil motor 73 to the moving part 30 and the driving force acts in a direction different from the position of center of gravity G of the moving part 30, not only the translational force in the Y direction but also torque about the center of gravity and translational force in the X direction occur upon application of force to the moving part 30. The torque and translational force in the X direction are unnecessary force components, and they may be diminished by simple feedback control of the first and second X-direction voice coil motors 71 and 72. However, the torque and translational force in the X direction constantly remain disturbing factors for the first and second X-direction voice coil motors 71 and 72, which may otherwise lead to a lowering accuracy of position control performance.

In the embodiment of the invention here, therefore, the voice coil motors 71, 72 and 73 are each controlled in such a way as to achieve a further reduction of torque and translational force occurring upon application of force to the moving part 30 by the voice coil motors 71, 72 and 73.

It is here to be noted that if the voice coil motors 71, 72 and 73 are each set up in such a way as to apply driving force to the moving part 30 in a direction different from the center of gravity G, it is then possible to achieve small-format size and bring up the degree of freedom in design, and so make contributions to size reductions. In addition, if at least two voice coil motors are designed to apply driving forces in parallel, it is then possible to achieve fast operation of the precise position of the moving part 30 and reduce to an amount of processing steps on that control operation.

Figure 12:
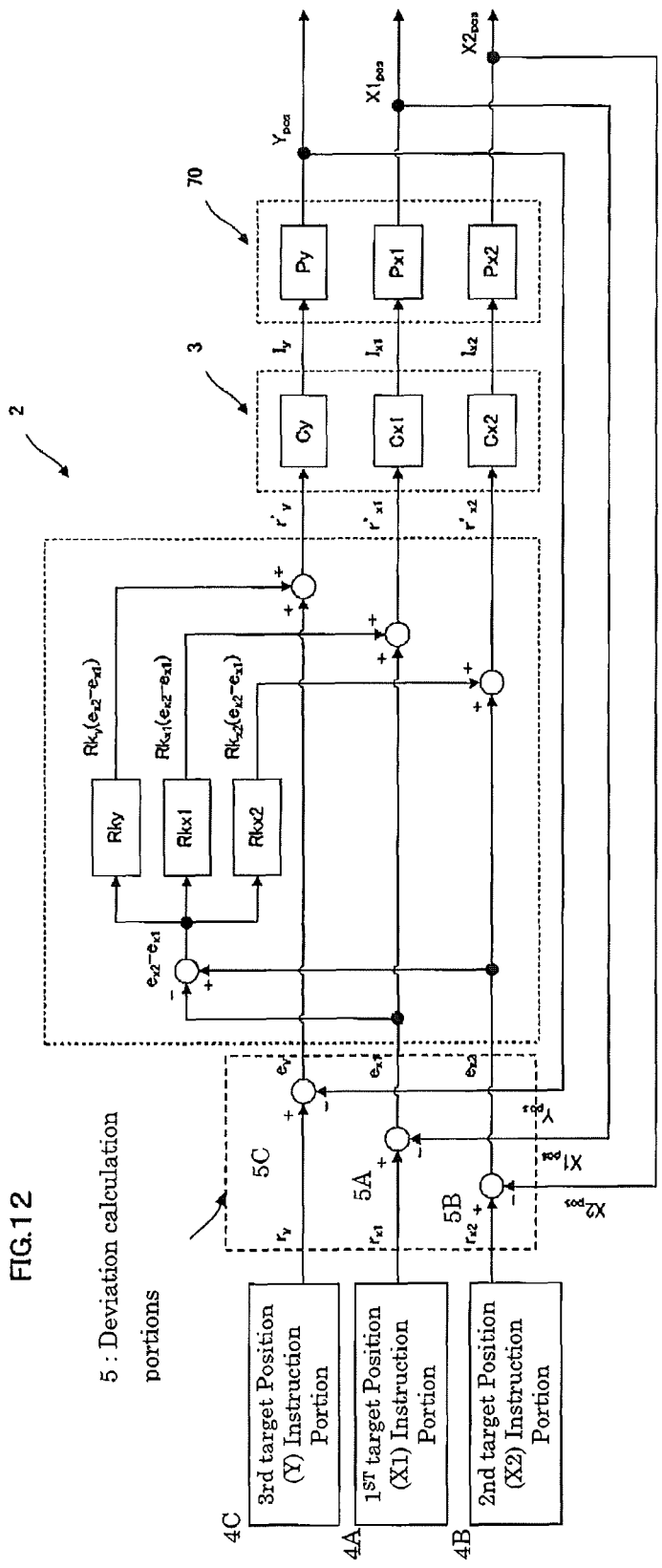
FIG. 12 is illustrative of the control block of the image-shake correction apparatus according to one embodiment of the invention.

FIG. 12 is a control block diagram for the image-shake correction apparatus 1 according to the embodiment of the invention here.

The control block of the image-shake correction apparatus 1 comprises a correction portion 2, a control portion 3 and a voice coil motor 70.

First, a first target displacement position signal $r_{x1}$ indicative of a displacement position is entered from a first instruction portion 4A into a first X-direction voice coil motor 71, whereupon a first X-direction deviation $e_{x1}$ serving as a first deviation that is a difference between the first target displacement position signal $r_{x1}$ and the present position $X1_{pos}$ of the second X-direction voice coil motor 72 is calculated out at a first deviation calculation portion 5A, providing feedback control.

Likewise, a second target displacement position signal $r_{x2}$ indicative of a displacement position is entered from a second instruction portion 4B into a second X-direction voice coil motor 72, whereupon a second X-direction deviation $e_{x2}$ serving as a second deviation that is a difference between the second target displacement position signal $r_{x2}$ and the present position $X2_{pos}$ of the second X-direction voice coil motor 72 is calculated out at a second deviation calculation portion 5B, providing feedback control.

Further, a third target displacement position signal $r_y$ indicative of a displacement position is entered from a third instruction portion 4C into a Y-direction voice coil motor 73, whereupon a Y-direction deviation $e_y$ serving as a third deviation that is a difference between the third target displacement position signal $r_y$ and the present position $Y_{pos}$ of the Y-direction voice coil motor 73 is calculated out at a third deviation calculation portion 5C, providing feedback control.

The correction portion 2 receives the first X-direction deviation $e_{x1}$ and adds up a value obtained by multiplying a difference between the first deviation and the second deviation by a first correction coefficient $Rk_{x1}$, producing an output as a first correction output signal $r'_{x1}$, and the correction portion 2 also receives the second X-direction deviation $e_{x2}$ and adds up a value obtained by multiplying a difference between the first deviation and the second deviation by a second correction coefficient $Rk_{x2}$, producing an output as a second correction output signal $r'_{x2}$. Further, the correction portion 2 receives the Y-direction deviation $e_y$ and adds up a value obtained by multiplying a difference between the first deviation and the second deviation by a third correction coefficient $Rk_y$, producing an output as a third correction output signal $r'_y$.

The control portion 3 receives the first correction output signal $r'_{x1}$ and implements phase compensation/gain multiplication processing or the like with a first X-direction IIR filter or the like, producing a first X-direction filter output $I_{x1}$. The control portion 3 also receives the second correction output signal $r'_{x2}$ and implements phase compensation/gain multiplication processing or the like with a second X-direction IIR filter or the like, producing a second X-direction filter output $I_{x2}$. Further, the control portion 3 receives the third correction output signal $r'_y$ and implements phase compensation/gain multiplication processing or the like with a Y-direction IIR filter or the like, producing a Y-direction filter output $I_y$.

The voice coil motor 70 drives the first X-direction voice coil motor 71 ($P_{x1}$) by a first X-direction output $I_{x1}$ from the control portion 3. The voice coil motor 70 also drives the second X-direction voice coil motor 72 ($P_{x2}$) by a second X-direction output $I_{x2}$ from the correction portion 2. Further, the voice coil motor 70 drives the Y-direction voice coil motor 73 ($P_y$) by a Y-direction output $I_y$ from the correction portion 2.

How to calculate the first, second and third correction coefficients $Rk_{x1}$, $Rk_{x2}$ and $Rk_y$ multiplied in the correction portion 2 is now explained.

In the arrangement of the Hall elements 34 shown in FIG. 11, suppose that $R_{x1}$ is indicative of a distance from the position of center of gravity to the first Hall element 34a, $R_{X2}$ is indicative of a distance from the position of center of gravity to the second Hall element 34b, and Ry is indicative of a distance from the position of center of gravity to the third Hall element 34c. Then, movements $\Delta H_{X1}$, $\Delta H_{X2}$ and $\Delta H_y$ of the first, second and third Hall elements 34a, 34b and 34c from the reference point of a rotation system could be given by the following Expressions (1), (2) and (3).

$$\Delta H_{X1}=R_{X1}\sin(\theta_{X1}-\theta rot)-R_{X1}\sin(\theta_{X1}) \quad (1)$$

$$\Delta H_{X2}=R_{X2}\sin(\theta_{X2}+\theta rot)-R_{X2}\sin(\theta_{X2}) \quad (2)$$

$$\Delta H_y=R_y\sin(\theta_y+\theta rot)-R_{X2}\sin(\theta_y) \quad (3)$$

Here, Expressions (1), (2) and (3) could be transformed into the following Expressions (4), (5) and (6) by approximation to a trigonometric function with the proviso of $\theta rot=(-\Delta H_{X1}+\Delta H_{X2})/(R_{X1}+R_{X2})$.

$$\Delta H_{X1}=-R_{X1}\times(-\Delta H_{X1}+\Delta H_{X2}) \quad (4)$$

$$\Delta H_{X2}=R_{X2}\times(-\Delta H_{X1}+\Delta H_{X2})/(R_{X1}+R_{X2}) \quad (5)$$

$$\Delta H_y=R_y\times(-\Delta H_{X1}+\Delta H_{X2})/(R_{X1}+R_{X2}) \quad (6)$$

Therefore, the first, second and third correction coefficients $Rk_{X1}$, $Rk_{X2}$ and $Rk_y$ could become the following Expressions (7), (8) and (9).

$$Rk_{X1}=-R_{X1}/(R_{X1}+R_{X2}) \quad (7)$$

$$Rk_{X2}=R_{X2}/(R_{X1}+R_{X2}) \quad (8)$$

$$Rk_y=R_y/(R_{X1}+R_{X2}) \quad (9)$$

Thus, by correcting the signals sent out to the first X-direction voice coil motor 71, second X-direction voice coil motor 72 and Y-direction voice coil motor 73 with the first, second and third correction coefficients $Rk_{X1}$, $Rk_{X2}$ and $Rk_y$, respectively, it is possible to prevent the moving part 30 from unnecessary rotation and process it constantly in an unerring position.

Figure 13:
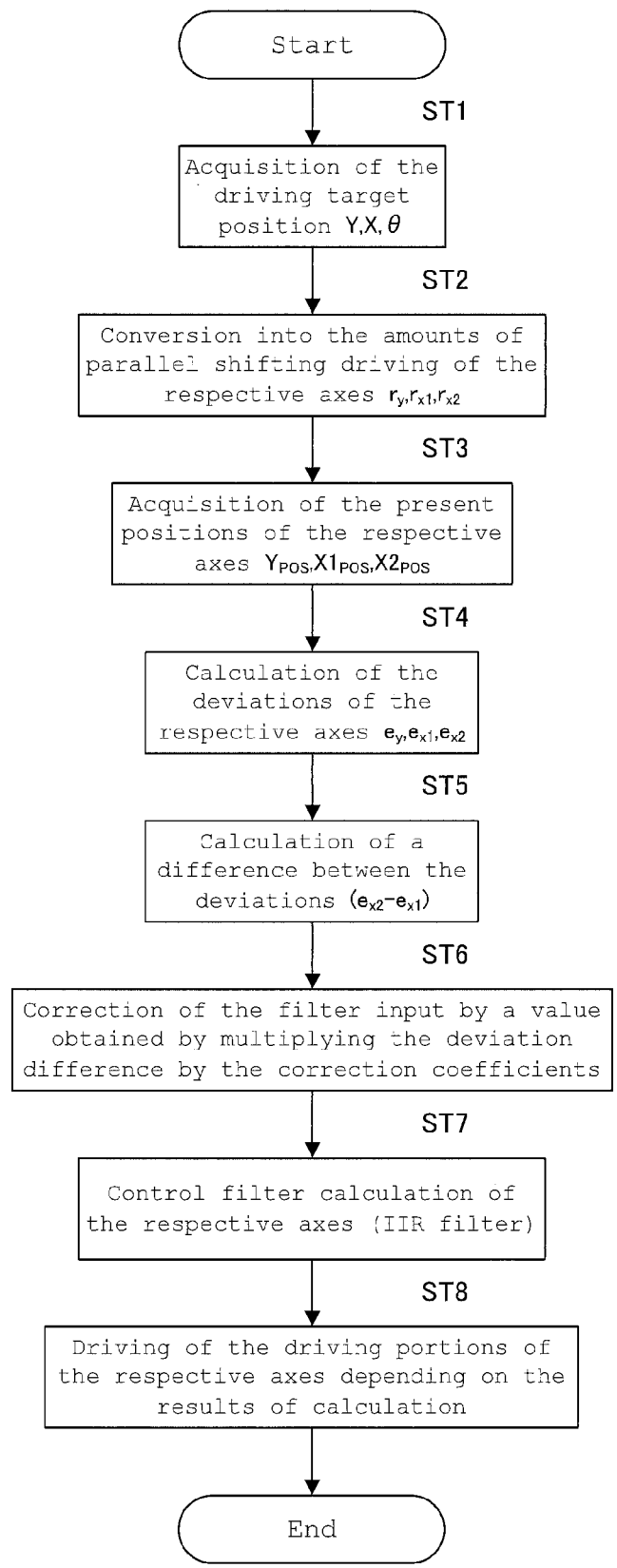
FIG. 13 is a flowchart of the image-shake correction apparatus according to one embodiment of the invention.

FIG. 13 is a flowchart of the image-shake correction apparatus 1 according to the embodiment of the invention here.

For control of the moving member of the image-shake correction apparatus 1 according to the embodiment of the invention here, target drive positions X, Y and θ are first acquired in Step 1 (ST1).

Then, the process goes to Step 2 for transforming the target drive positions X, Y and θ into the amounts of translational driving $r_{X1}$, $r_{X2}$ and $r_y$ in the respective X1, X2 and Y axis directions (ST2).

Then, the process goes to Step 3 for acquiring the present positions $X1_{POS}$, $X2_{POS}$ and $Y_{POS}$ by the first, second and third Hall elements 34a, 34b and 34c, respectively (ST3).

Then, the process goes to Step 4 for finding differences of the present positions $X1_{POS}$, $X2_{POS}$ and $Y_{POS}$ of the respective axes, obtained in Step 3, from the amounts of translational driving in the respective axis directions, obtained in Step 2, thereby calculating the deviations $e_y$, $e_{X1}$ and $e_{X2}$ of the respective axes (ST4).

Then, the process goes to Step 5 for calculating a deviation difference $(e_{X2}-e_{X1})$ in the X1 and X2 directions in the correction portion 2 (ST5).

Then, the process goes to Step 6 where, in the correction portion 2, a first correction value $Rk_{X1}(e_{X2}-e_{X1})$ obtained by multiplying the X1- and X2-direction deviation difference $(e_{X2}-e_{X1})$ by the first correction coefficient $Rk_{X1}$ and the first X-direction deviation $e_{X1}$ are added up into a first X-direction correction output $r_{X1}$, a second correction value $Rk_{X2}(e_{X2}-e_{X1})$ obtained by multiplying the X1- and X2-direction deviation difference $(e_{X2}-e_{X1})$ by the second correction coefficient $Rk_{X2}$ and the second X-direction deviation $e_{X2}$ are added up into a second X-direction correction output $r_{X2}$, and a third correction value $Rk_y(e_{X2}-e_{X1})$ obtained by multiplying the X1- and X2-direction deviation difference $(e_{X2}-e_{X1})$ by the third correction coefficient $Rk_y$ and the Y-direction deviation $e_y$ are added up into a Y-direction correction output $r_y$ (ST6).

Then, the process goes to Step 7 for calculation of control filter outputs $I_{X1}$, $I_{X2}$ and $I_y$ of the respective axes in the control portion 3 (ST7).

Then, the process goes to Step 8 for driving the voice coil motors of the respective axes depending on the results of calculation (ST8).

Such moving member control allows for a small-format apparatus having a high degree of freedom in design, and enables control of the moving part 30 such that it moves rapidly and unerringly relative to the base part 10.

The image-shake correction apparatus as described above may be used with electronic imaging apparatus, inter alia a digital camera, a video camera or the like, as can been seen from the following exemplary embodiments.

Figure 14:
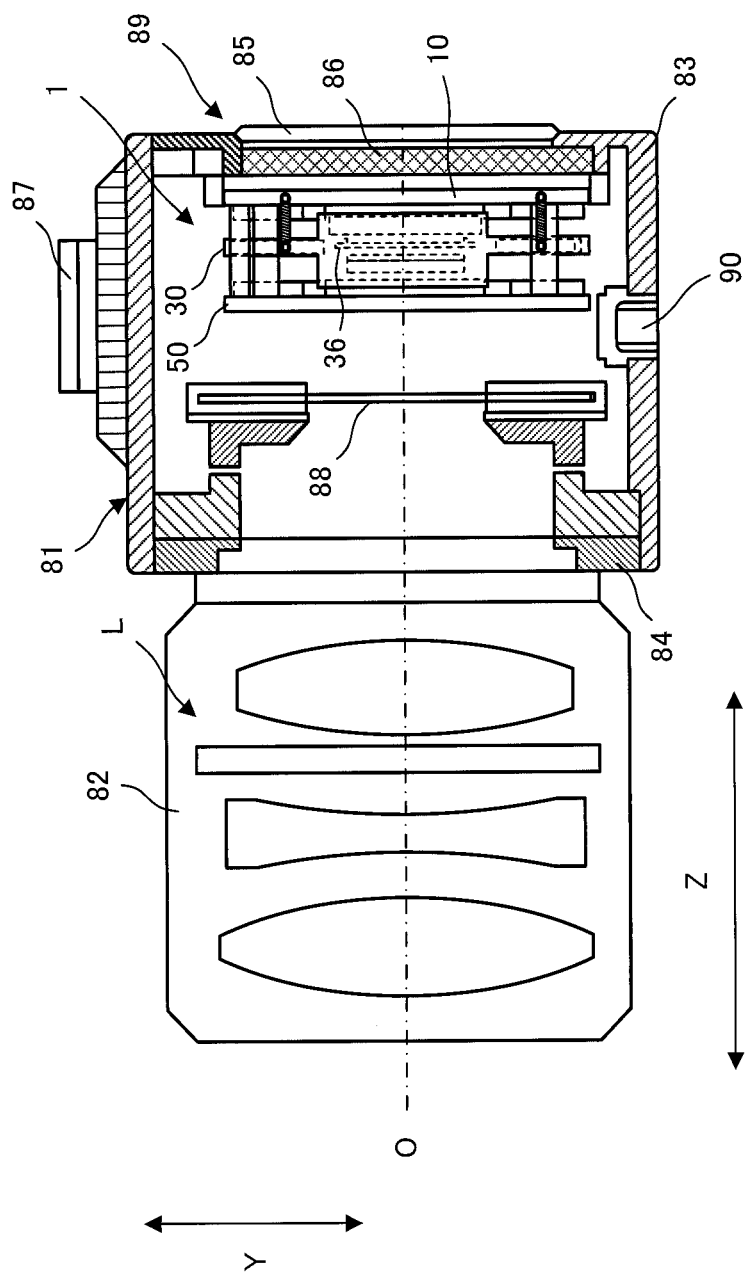
FIG. 14 is illustrative of a specific imaging apparatus including the image-shake correction apparatus according to one embodiment of the invention.
Figure 15:
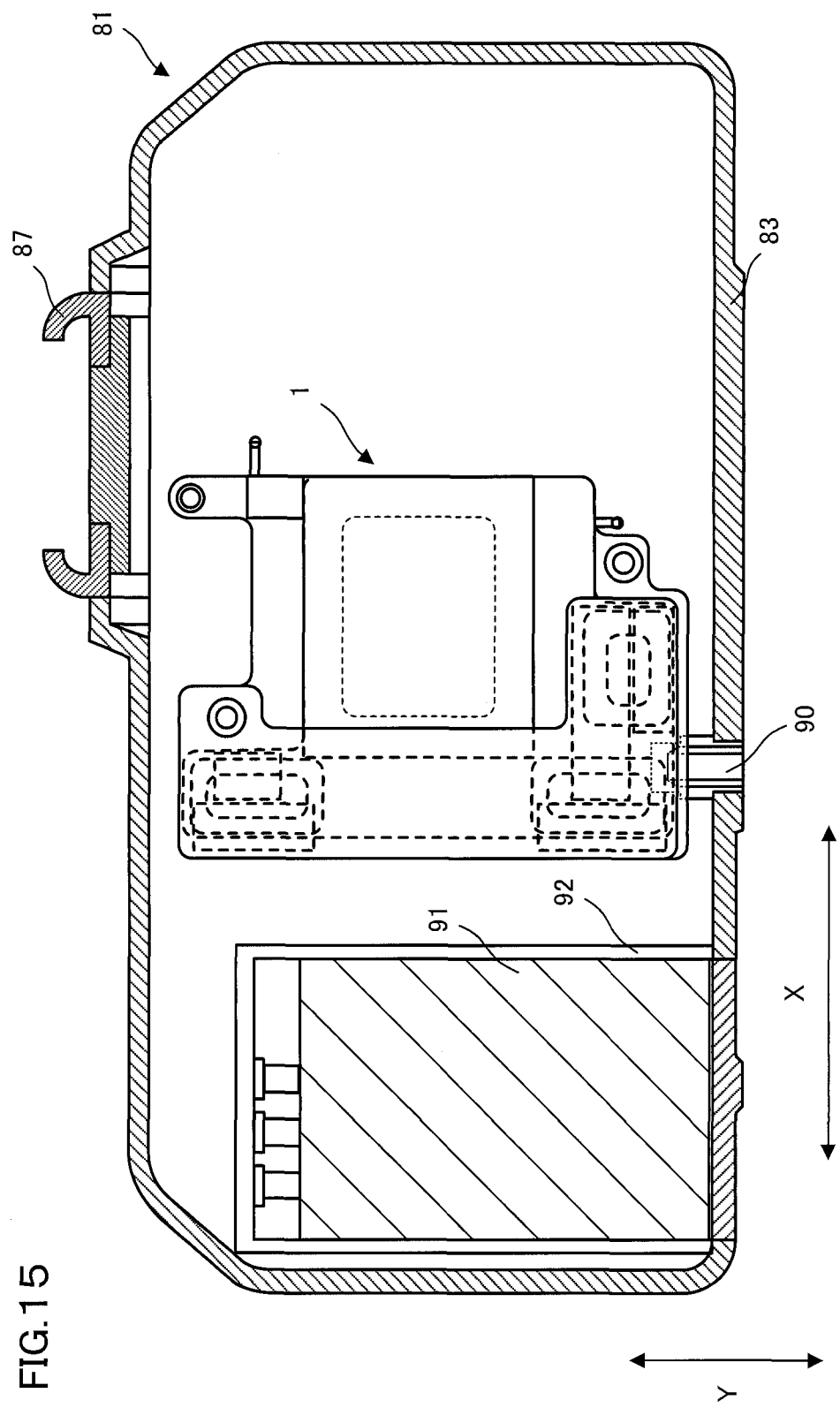
FIG. 15 is illustrative of the image-shake correction apparatus, etc. in the imaging apparatus.

FIG. 14 is illustrative of an imaging apparatus comprising the image-shake correction apparatus according to one embodiment of the invention, and FIG. 15 is illustrative of the image-shake correction apparatus, etc. within the imaging apparatus.

A digital camera 80 that is an imaging apparatus comprising the image-shake correction apparatus according to one embodiment of the invention comprises a camera body 81, and a lens unit 82 including an imaging lens L that is interchangeably mounted on the camera body 81, as shown in FIGS. 14 and 15.

It is here to be noted that an axis of light entering from the imaging lens L into the camera body 81 is indicated by O, and that the object side of the cameral body 81 with respect to the axis of incident light is called the front (front surface side) and the imaging side is called the rear (rear surface side). It is also to be noted that of directions orthogonal to the optical axis O, the horizontal direction as viewed from the front in an ordinary operation state is defined as the first or X direction, and the vertical direction is defined as the second or Y direction. The first or X direction and the second or Y direction correspond to the first or X direction and the second or Y direction with respect to the image-shake correction apparatus 1.

The camera body 81 comprises an outer casing 83 also serving as a camera proper that houses therein members forming the digital camera 80, and includes in a front position on the incident optical axis O a ring-like mount 84 for interchangeable mounting of the lens unit 82. On the left side as viewed from the front, the outer casing 83 is provided with a grip (not shown) held by the right hand of a camera operator during imaging operation. On top of the grip there are various switches and buttons such as a release button located.

Further, the camera body 81 comprises a battery chamber 92 for stowing away batteries 91 within the outer casing 83. In the rear of the battery chamber 92, there are a circuit board or the like (not shown) provided, having a circuit board or the like (not shown) including a control circuit for implementing control over the camera, image processing, compression processing, data storage processing or the like, and a memory such as SDRAM and a power source circuit, etc. Furthermore, the camera body 81 has a built-in shake-status detector (not shown) for that camera body which uses a gyro sensor or the like as an example.

As shown in FIGS. 14 and 15, the camera body 81 further comprises a liquid crystal panel 86 having a panel display window on the rear surface side of the outer casing 83. This liquid crystal panel 86 is a TFT (thin-film transistor) type of rectangular display panel that is capable of not only displaying taken images but also showing as images various information pieces such as various settings and adjustments. On top of the outer casing 83, there is a hot shoe 87 located for attachment of an optical viewfinder, an electronic viewfinder, an external flash, a microphone, etc.

Within the outer casing 83 of the camera body 81, there are a focal plane shutter 88 and an imaging unit 89 received as shown in FIG. 14. The imaging unit 89 comprises an image-shake preventing apparatus 1 that supports an imaging device 36 such as a CCD (charge coupled device (image sensor)) and a CMOS sensor (complementary metal oxide semiconductor (image sensor)) on the XY plane in a displaceable fashion and uses a voice coil motor as an actuator. This image-shake preventing apparatus 1 operates in response to a shake signal from the above-mentioned shake detector to cancel out the force detected in the shake direction. The imaging device 36 includes a light-receiving plane having a long side along the X direction. The outer casing 83 is provided on its bottom surface with a tripod screw portion 90.

Figure 16:
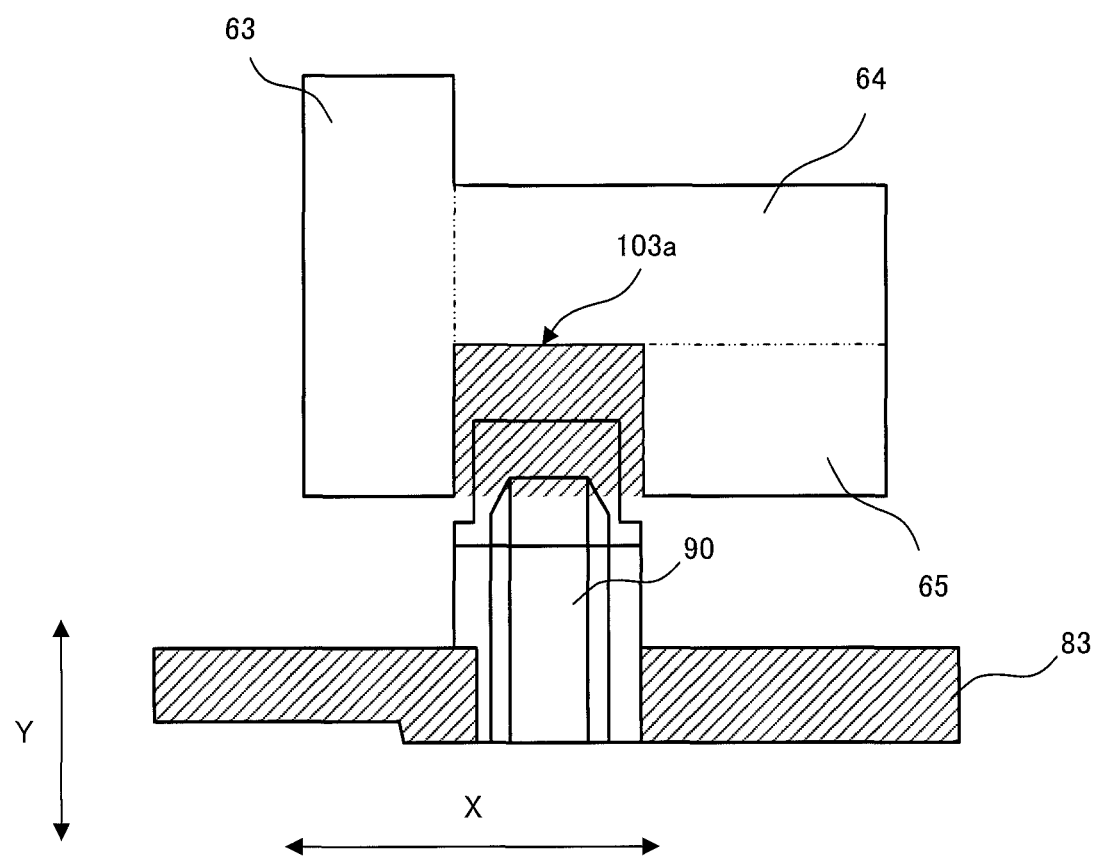
FIG. 16 is an enlarged view of the imaging apparatus in the vicinity of a tripod screw portion.

FIG. 16 is an enlarged view of the digital camera 80 in the vicinity of the tripod screw portion.

Upon mounting of the image-shake correction apparatus 1 to the digital camera 80, there is a possibility that it may interfere with the tripod screw portion 90. Such interference can be avoided if the X-direction lengths of the fourth and fifth magnet portions 64 and 65 are made different from each other to receive the tripod screw portion 90 in the fifth space 103a as shown in FIG. 16.

Thus, upon attachment of the image-shake correction apparatus 1 to the digital camera 80, there is a possibility that the members within the digital camera 80 may interfere with the image-shake correction apparatus 1. This interference of the members within the digital camera 80 with the image-shake correction apparatus 1 can be avoided if the lengths of the magnet portions are made different from each other to form a cutout for receiving those members, thereby reducing the size of the digital camera 80.

Figure 17:
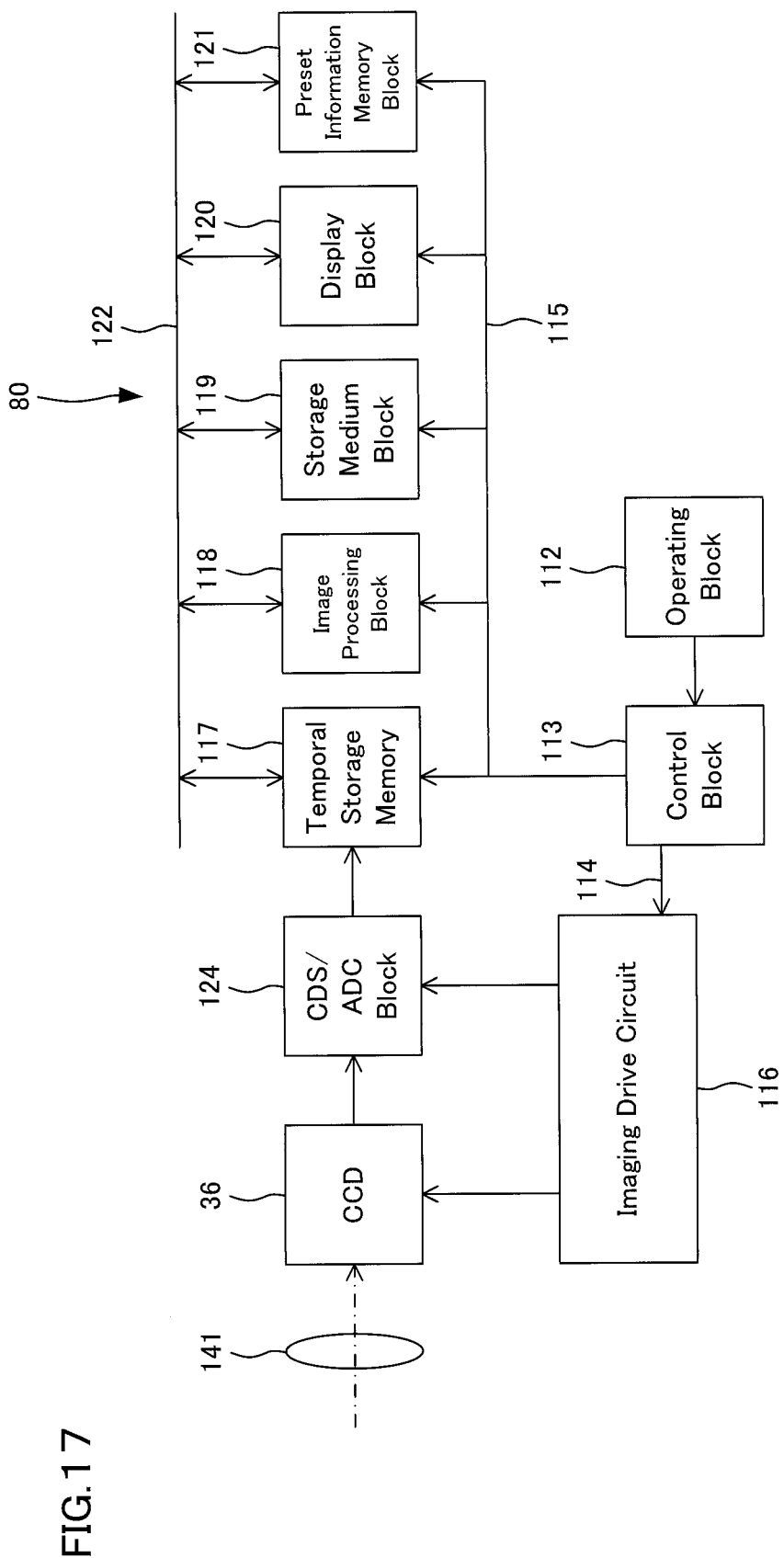
FIG. 17 is a block diagram of the control arrangement of the digital camera according to one embodiment of the invention.

FIG. 17 is a block diagram illustrative of the internal circuitry of a main part of the digital camera 80 according to the embodiment of the invention here. In the following explanation, the processing means are constructed typically from a CDS/ADC portion 124, a temporal storage memory 117, an image processing portion 118 and so on, and the storage means are made up of a storage medium and so on.

As shown in FIG. 17, the digital camera 80 includes an operating portion 112, a control portion 113 connected to the operating portion 112, an imaging drive circuit 116 and a temporal storage memory 117 connected to the control signal output port of the control portion 113 via buses 114 and 115, an image processing portion 118, a storage medium portion 119, a display portion 120, and a preset information storage memory portion 121.

The temporal storage memory 117, image processing portion 118, storage medium portion 119, display portion 120 and preset information storage memory portion 121 are designed such that data are mutually entered in or produced out of them via a bus 22, and the imaging drive circuit 116 is connected with the imaging device 36 and CDS/ADC portion 124.

The operating portion 112 is a circuit including various input buttons and switches, through which event information entered (by the camera operator) from outside is notified to the control portion 113. The control portion 113 is a central processing unit that is made up of typically a CPU and has a built-in program memory (not shown): it is a circuit that, according to the program loaded in that program memory, has control over the digital camera 80.

The imaging device 36 such as the CCD is the one that is driven and controlled by the imaging drive circuit 116, and converts or transforms light quantity per pixel of the object image formed through the imaging optical system 111 into electrical signals that are in turn sent out to the CDS/ADC portion 24.

The CDS/ADC portion 124 is made up of a co-related double sampling circuit and an analog to digital conversion circuit, and amplifies electrical signals entered from the imaging device 36 to remove noises from the electrical signals from the imaging device 36 by means of co-related double sampling. Then, the electrical signals cleared of noises are subjected to analog to digital conversion so that image raw data (Bayer pattern output image data: hereinafter called the RAW data) subjected only to amplification and digital conversion are sent out to the temporal storage memory 117.

The temporal storage memory 117 is a buffer memory made up of typically an SDRAM (synchronous dynamic random access memory): it is a memory device for temporal storage of the RAW data produced out of the CDS/ADC portion 124. The image processing portion 118 is a circuit that reads out the RAW data stored in the temporal storage memory 117 or the RAW data stored in the storage medium portion 119 thereby electrically implementing various forms of processing including distortion correction, based on an image quality parameter instructed by the control portion 113.

The storage medium portion 119 detachably receives a card type or stick type of recording medium comprising typically a flash memory so that the RAW data transferred from the temporal memory 117 or image data processed at the image processing portion 118 are recorded and held in that flash memory 117.

The display portion 120 is made up of a liquid crystal display monitor or the like to display the taken RAW data or image data, operating menus or the like on it. The preset information storage memory portion 121 includes a ROM (read only memory) portion having various image quality parameters previously loaded in it, and a RAM (random access memory) portion for storing an image quality parameter read out of that ROM portion by entering operation of the operating portion 112.

The thus setup digital camera 80 makes use of the inventive lens system as the imaging optical system 114, providing an imaging apparatus that is of small-format size and well fit for taking of moving images.

It is to be understood that some embodiments described herein are not intended as limitations on the present invention. Although many exemplary specific details are included in the explanation of illustrative embodiments, it will be readily apparent to those skilled in the art that varying substitutions or modifications may be made to such detailed disclosures without departing from the scope of the invention. In other words, some exemplary embodiments of the invention have been described without losing the generality of the invention recited in the claims, and imposing any particular limitations on the invention.

For instance, some exemplary embodiments of invention have been explained with reference to a structure capable of moving and controlling the moving part 30 including the imaging device 36; however, the invention may also be applied to an arrangement having the lens unit 82 as the moving part to be controlled. Alternatively, the invention illustratively described herein may also be applied to a translational moving member such as a printer s head.

What is claimed is:

1. A moving member control apparatus comprising:
a fixed base;
a moving part configured to be relatively movable with respect to the fixed base;
a first actuator configured to apply driving force to the moving part;
a second actuator configured to apply driving force to the moving part;
a first position detector configured to detect a real position of the first actuator;
a second position detector configured to detect a real position of the second actuator;
a control circuit that:
gives an instruction of a first target displacement position to the first actuator about a displacement position;
gives an instruction of a second target displacement position to the second actuator about a displacement position;
calculates a first deviation between the first target displacement position and a real position detected by the first position detector;
calculates a second deviation between the second target displacement position and a real position detected by the second position detector;
produces a first correction signal and a second correction signal corrected for the first deviation and the second deviation, respectively, depending on a difference between the first deviation and the second deviation, and predetermined first and second correction coefficients based on relations between a first distance from the center of gravity of the moving part to the first position detector and a second distance from the center of gravity of the moving part to the second position detector; and
controls driving forces of the first actuator and the second actuator based on the first correction signal and the second correction signal, respectively.

2. The moving member control apparatus according to claim 1, wherein the first actuator and the second actuator are configured to apply driving force toward a direction different from a position of center of gravity of the moving part.

3. The moving member control apparatus according to claim 1, wherein the first actuator and the second actuator are configured to apply driving forces in parallel.

4. The moving member control apparatus according to claim 1, wherein the control circuit multiplies a difference between the first deviation and the second deviation by the first correction coefficient and adds the resulting value up to the first deviation into the first correction signal, and multiplies a difference between the first deviation and the second deviation by the second correction coefficient and adds the resulting value up to the second deviation into the second correction signal.

5. The moving member control apparatus according to claim 4, wherein the first correction coefficient and the second correction coefficient comprise the following expressions (A) and (B):

$$Rk_{X1} = -R_{X1}/(R_{X1}+R_{X2}) \quad (A)$$

$$Rk_{X2} = R_{X2}/(R_{X1}+R_{X2}) \quad (B)$$

where $Rk_{X1}$ is the first correction coefficient,
$Rk_{X2}$ is the second correction coefficient,
$R_{X1}$ is a distance from the center of gravity of the moving part from the first position detector, and
$R_{X2}$ is a distance from the center of gravity of the moving part from the second position detector.

6. The moving member control apparatus according to claim 1, further comprising:
a first permanent magnet and a second permanent magnet; and
a first coil located in a position opposite to the first permanent magnet and a second coil located in a position opposite to the second permanent magnet, respectively, wherein:
the first permanent magnet and the first coil form together a first voice coil motor as the first actuator, and
the second permanent magnet and the second coil form together a second voice coil motor as the second actuator.

7. The moving member control apparatus according to claim 1, further comprising:
a third actuator configured to apply driving force to the moving part in a direction different from the first actuator and the second actuator; and
a third position detector configured to acquire a real position of the third actuator;
wherein the control circuit:
gives an instruction of a third target displacement position to the third actuator about a position;
calculates a third deviation between a displacement position and a real position acquired by the third position detector;
produces a third correction signal corrected for the third deviation depending on a difference between the first deviation and the second deviation, and a predetermined third correction coefficient based on relations that comprises the first distance, the second distance, and a third distance from the center of gravity of the moving part to the third position detector, and
controls driving force of the third actuator based on the third correction signal.

8. The moving member control apparatus according to claim 7, wherein the third actuator is configured to apply driving force toward a direction different from the position of center of gravity of the moving part.

9. The moving member control apparatus according to claim 7, wherein the third actuator is configured to apply driving force in a direction different from the first actuator and the second actuator.

10. The moving member control apparatus according to claim 7, wherein the third actuator is configured to apply driving force in a direction vertical to the first actuator and the second actuator.

11. The moving member control apparatus according to claim 7, wherein the control circuit multiplies a difference between the first deviation and the second deviation by the third correction coefficient and adds the resulting value up to the third deviation.

12. The moving member control apparatus according to claim 11, wherein the third correction coefficient comprises the following expression (C):

$$Rk_y = R_y/(R_{X1}+R_{X2}) \quad (C)$$

where $Rk_y$ is the third correction coefficient, and
$R_y$ is a distance from the center of gravity of the moving part to the third position detector.

13. The moving member control apparatus according to claim 7, further comprising:

a third permanent magnet; and a third coil located in a position opposite to the third permanent magnet, and the third permanent magnet and the third coil form together a third voice coil motor as the third actuator.

14. An imaging apparatus comprising:

the moving member control apparatus according to claim 1;

an imaging device that is located on the moving part for photoelectrical conversion of light; and a body configured to contain the moving member control apparatus.

15. An imaging apparatus comprising:

the moving member control apparatus according to claim 7;

an imaging device that is located on the moving part for photoelectrical conversion of light; and a body configured to contain the moving member control apparatus.

* * * * *